United States Patent
Zillmer et al.

(10) Patent No.: US 6,854,267 B2
(45) Date of Patent: Feb. 15, 2005

(54) EXHAUST GAS SYSTEM OF AN INTERNAL COMBUSTION ENGINE WITH A CATALYST

(75) Inventors: Michael Zillmer, Sickte (DE); Ekkehard Pott, Gifhorn (DE); Karsten Michels, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/398,127

(22) PCT Filed: Aug. 28, 2001

(86) PCT No.: PCT/EP01/09897
§ 371 (c)(1),
(2), (4) Date: Mar. 31, 2003

(87) PCT Pub. No.: WO02/29212
PCT Pub. Date: Apr. 11, 2002

(65) Prior Publication Data
US 2004/0093857 A1 May 20, 2004

(30) Foreign Application Priority Data
Sep. 30, 2000 (DE) .................. 100 48 580

(51) Int. Cl.$^7$ ................................ F01N 3/00
(52) U.S. Cl. ........................... 60/298; 60/320
(58) Field of Search .......... 60/288, 298, 305, 60/320

(56) References Cited

U.S. PATENT DOCUMENTS

| | | | | |
|---|---|---|---|---|
| 5,251,564 A | * | 10/1993 | Rim et al. ............. | 110/344 |
| 5,335,492 A | * | 8/1994 | Zirkel ................... | 60/298 |
| 5,687,565 A | * | 11/1997 | Modica et al. .......... | 60/274 |
| 5,979,159 A | | 11/1999 | Adamczyk et al. | |
| 5,983,628 A | | 11/1999 | Borroni-Bird et al. | |
| 6,571,551 B2 | * | 6/2003 | Lundgren et al. ...... | 60/298 |
| 6,647,711 B1 | * | 11/2003 | Spiegel et al. ......... | 60/288 |

FOREIGN PATENT DOCUMENTS

| | | |
|---|---|---|
| DE | 4410022 | 10/1995 |
| DE | 19742762 | 12/1998 |
| DE | 29903382 | 7/1999 |
| DE | 19905345 | 9/1999 |
| EP | 839995 | 5/1998 |
| EP | 1031708 | 8/2000 |
| WO | WO 8904915 | 6/1989 |
| WO | WO01/42632 * | 6/2001 |

* cited by examiner

Primary Examiner—Thomas Denion
Assistant Examiner—Diem Tran
(74) Attorney, Agent, or Firm—Ostrolenk, Faber, Gerb & Soffen, LLP

(57) ABSTRACT

An exhaust gas system of an internal combustion engine, including a catalyst, and a cooling section provided upstream of the catalyst. The cooling section includes an additional cooling arrangement provided so that in all operating phases of the internal combustion engine with their different exhaust gas mass flow rates, the amount of thermal energy dissipated from the exhaust gas relative to a total amount of thermal energy present in the exhaust gas (relative heat dissipation) is increased in such a way that a maximum temperature reduction is obtained at intermediate values of the exhaust gas mass flow rate.

12 Claims, 3 Drawing Sheets

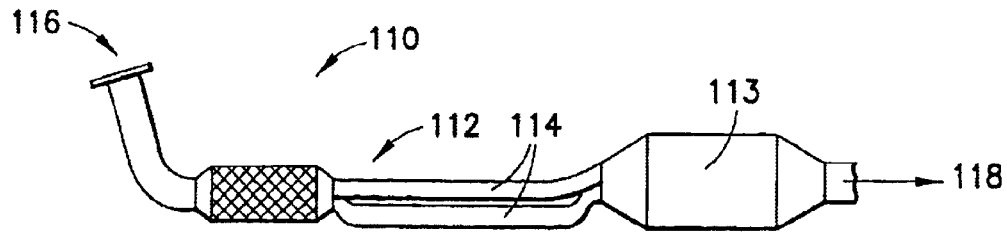
FIG. 2
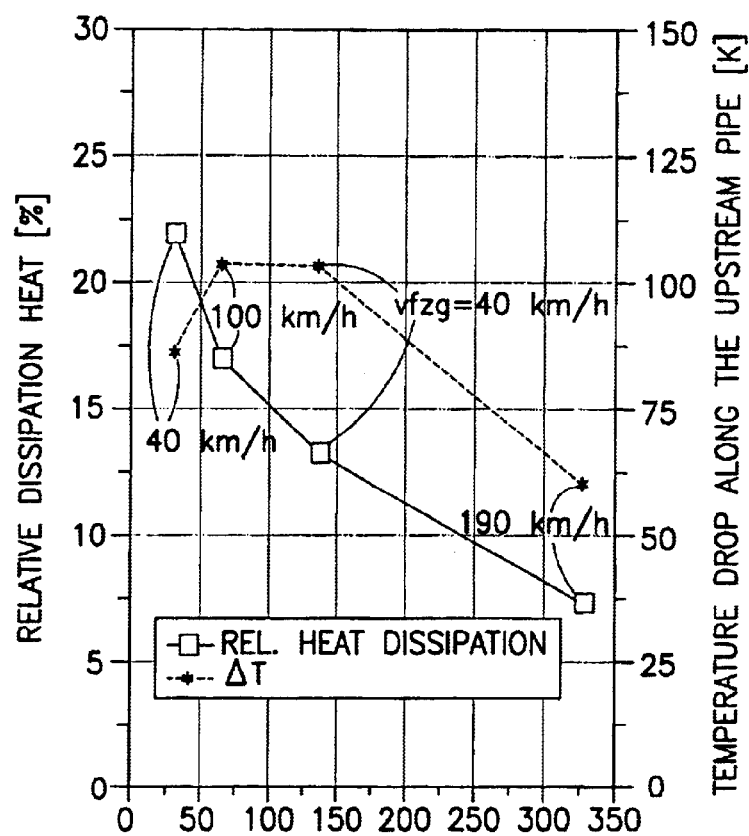
FIG. 3a
| VALUE TABLE: | EXHAUST GAS MASS FLOW RATE (egmfr) | | [kg/h] | |
|---|---|---|---|---|
| | egmfr=31kg/h | egmfr=65kg/h | egmfr=136kg/h | egmfr=330kg/h |
| TEMP. REDUCTION | 86K | 103K | 103K | 58K |
| REL. HEAT DISSIPATION | 22% | 17% | 13% | 7% |
FIG. 3b

EXHAUST GAS SYSTEM OF AN INTERNAL COMBUSTION ENGINE WITH A CATALYST

PRIORITY CLAIM

This is a U.S. national stage of application No. PCT/EP01/09897, filed on Aug. 28, 2001. Priority is claimed on that application and on the following application:

Country: Germany, Application No.: 100 48 580.4, Filed: Sep. 30, 2000.

BACKGROUND OF THE INVENTION

The invention pertains to an exhaust gas system of an internal combustion engine, especially of a motor vehicle, with a $NO_x$ storage catalyst, where a cooling section is provided upstream of the catalyst.

For spark-ignition engines with direct fuel injection, $NO_x$ storage catalysts are being used increasingly as a way of converting nitrogen oxides. Because sufficiently high conversion rates are achieved with such catalysts only in relatively narrow exhaust gas temperature windows, it is necessary to coordinate the operation of the engine and the catalyst system with each other in such a way that the exhaust gas temperatures at the inlet to the storage catalyst are within the temperature window over the widest possible operating range.

To prevent the upper temperature limits from being exceeded, the use of exhaust gas systems with a cooling section is a reasonable approach, where this cooling section effectively lowers the temperature of the exhaust gas. Thus the thermal load on the catalyst system is also reduced simultaneously and the service life of the catalyst is prolonged. For example, an exhaust gas after-treatment device for a motor vehicle for the treatment of the exhaust gas stream with a three-way catalyst and a downstream $NO_x$ trap is known from DE 199 05 345 A1. Between the three-way catalyst and the $NO_x$ trap, the exhaust gas is conducted along a temperature-changing route with sensitive parallel paths with continuous flow. This has the result that fast-flowing exhaust gas flows primarily along a route with higher heat energy dissipation, whereas slow-flowing exhaust gas flows primarily along a route with lower heat energy dissipation, so that the temperature upstream of the $NO_x$ trap can be maintained within a predetermined window. As a result of this measure, the relative heat dissipation (amount of heat dissipated relative to the total amount of heat present in the exhaust gas) is reduced for low exhaust gas mass flow rates, whereas the relative heat dissipation is increased for high exhaust gas mass flow rates. This arrangement is complicated and expensive, however, especially when maintenance or repairs are required.

SUMMARY OF THE INVENTION

The present invention is therefore based on the task of providing an exhaust gas system of the type indicated above in which, with modest effort, it is possible to prevent the temperatures from exceeding the upper temperature limit over as much of the lean operating range of the internal combustion engine as possible.

For this purpose, it is provided according to the invention that the cooling section is designed with multiple flow routes of suitable form and/or with additional cooling means, as a result of which the amount of heat energy dissipated from the exhaust gas relative to the heat energy contained in the exhaust gas (=the relative heat energy dissipation) is increased in all associated operating phases of the internal combustion engine with their different exhaust gas mass flow rates.

This has the advantage that the maximum temperature reduction by the cooling section relative to the nominal output point is situated at intermediate values of the exhaust gas mass flow rate, which means that the strongest cooling effect occurs when the exhaust gas temperatures upstream of the catalyst just reach the upper temperature limit for lean engine operation. By the use of additional cooling means, the maximum temperature reduction can be shifted to higher exhaust gas mass flow rates and thus adjusted optimally to the operating behavior of the engine.

To increase the surface area of the heat-transfer surface, the additional cooling means comprise uniformly distributed, outward-projecting ribs arranged externally on the circumference of the cooling section.

To increase the surface area and also to create turbulence with the result of greater heat transfer from the exhaust gas to the environment, the additional cooling means comprise at least one exhaust gas feed line designed as a heat exchanger which has an ovality which varies in the longitudinal direction.

A further increase in the surface area and a further improvement in the creation of turbulence are achieved in that the additional cooling means comprise at least one exhaust gas feed line with undulations in the longitudinal direction.

Additional cooling means comprising at least one exhaust gas feed line with inward-directed indentations leads to an increase both in the area of the heat-transfer surface and in the turbulence of the exhaust gas stream flowing through the line.

To create turbulence in the exhaust gas stream in the cooling section and simultaneously to increase the surface area, the additional cooling means comprise at least one exhaust gas feed line with internal pleats, which can be oriented, if desired, at an angle to the flow direction.

In an especially preferred embodiment, the additional cooling means comprise at least one exhaust gas feed line with a cross section in the form of an n-sided polygon, a rectangle, a triangle, a half-circle, or a half-oval.

A further increase in the heat dissipation from the exhaust gas is achieved in that the additional cooling means have at least one coating provided in the area of the cooling section, which coating promotes the dissipation of heat and/or in that the additional cooling means comprise a device for subjecting the cooling section to the effect of a stream of outside air.

BRIEF DESCRIPTION OF THE DRAWINGS

Additional features, advantages, and advantageous designs of the invention can be derived from the following description of the invention, which is based on the attached drawings:

FIG. 2 shows a preferred embodiment of an exhaust gas system according to the invention;

FIG. 3a shows another graph of the relative heat dissipation and of the temperature reduction as a function of the exhaust gas mass flow rate;

FIG. 3b shows a value table for the graph of FIG. 3a;

DETAILED DESCRIPTION OF THE PREFERRED EMBODIMENTS

Figure 1:
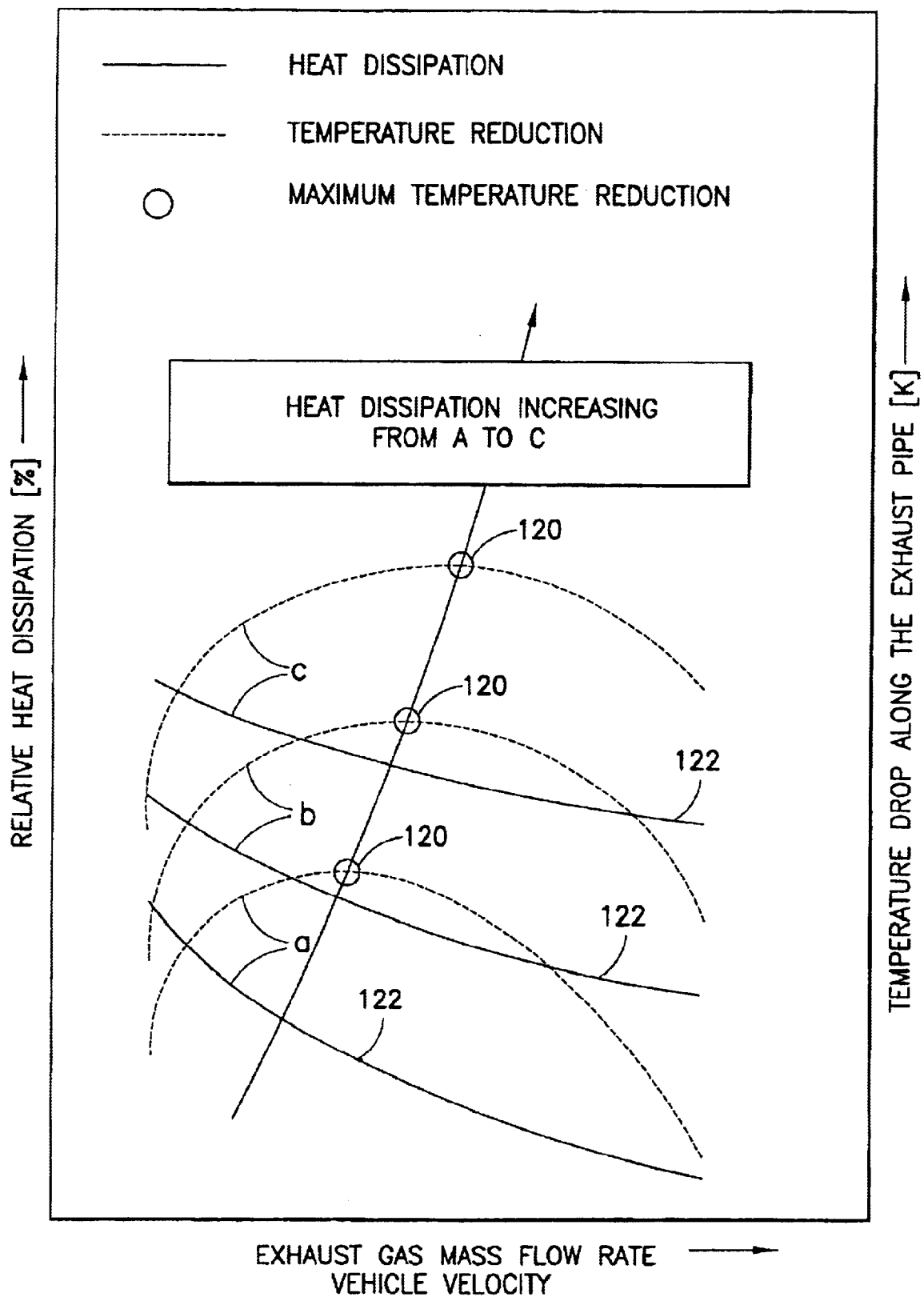
FIG. 1 shows a graph of the relative heat dissipation and of the temperature reduction as a function of an exhaust gas mass flow rate and of the velocity of the vehicle.

Curve (a) in FIG. 1 shows qualitatively the temperature reduction occurring in a conventional exhaust gas system as a function of the exhaust gas mass flow rate and the velocity of the vehicle. The temperature reduction (broken line) shows a typical course, which rises at first from low to intermediate exhaust gas mass flow rates and then decreases again at high exhaust gas mass flow rates. By means of the invention, the cooling effect of the exhaust gas system is now optimally attuned to the operating behavior of the vehicle with a directly-injected spark-ignition engine. For this purpose, the exhaust gas system 110 shown in FIG. 2 is designed with multiple flow routes and/or provided with additional cooling means in the area of the cooling section 112 upstream of the catalyst 113 in order to increase the overall heat dissipation (solid lines in FIG. 1). This is illustrated by curves (b) and (c) in FIG. 1. The multi-route cooling section 112 shown in FIG. 2 comprises several exhaust gas feed lines 114. The exhaust gas enters at 116 and exists at 118.

It is advantageous for the region of the strongest cooling effect to occur when the exhaust gas temperature upstream of the catalyst 113, which can be designed, for example, as a $NO_x$ storage catalyst, has just reached the upper temperature limit for lean engine operation. The exhaust gas temperatures are typically in a range of approximately 400–550° C., which corresponds to a velocity range of approximately 60–160 km/h (steady driving on level terrain), depending on the engine/transmission/vehicle combination.

In the design of the exhaust gas system, the following factors are coordinated with each other providing the cooling behavior according to the invention:

1. The size of the heat-dissipating surface determined by the number of pipes and their diameter and length;
2. Increasing the internal heat transfer, for example by increasing the turbulence;
3. Improving the external heat transfer coefficient by effectively directing a flow of air, such as the wind generated by driving, over air guide elements or air guide channels or blowers;
4. Increasing the heat dissipation by radiation by the use of, for example, special surface coatings.

As a result, both the absolute cooling level is increased and the point or range of the maximum cooling effect (points 120 in FIG. 1) is shifted to higher exhaust gas mass flow rates (higher vehicle velocities). For a predetermined heat-dissipating surface, this is advantageous especially because of the fact that, as a result, the cold-start behavior is subjected to only a slight negative influence. The catalyst should heat up as quickly as possible in this case, which demands the least possible loss of heat via the exhaust gas system and the smallest possible amount of thermally inert mass. In addition, the catalyst is prevented from leaving the lower working window too quickly at very low driving speeds (and also at low ambient temperatures).

FIG. 1 also plots the heat which is dissipated via the pipe walls versus the total amount of heat in the exhaust gas (relative heat dissipation) (solid lines 122). It is characteristic that this value decreases with increasing exhaust gas mass flow rate (increasing driving speed) for all variants.

FIGS. 3a and 3b show measurement values in the form of a graph and a table, respectively, obtained from a preferred embodiment of an exhaust gas system according to the invention. In FIG. 3a, the reduction of the exhaust gas temperature occurring along the cooling section 112 is plotted as a function of the exhaust gas mass flow rate (vehicle velocity). It can be seen immediately that, in the desired velocity range, the maximum exhaust gas temperature reduction occurs upstream of the $NO_x$ storage catalyst 113. The change in the relative heat dissipation is also entered in the graph.

Figure 4:
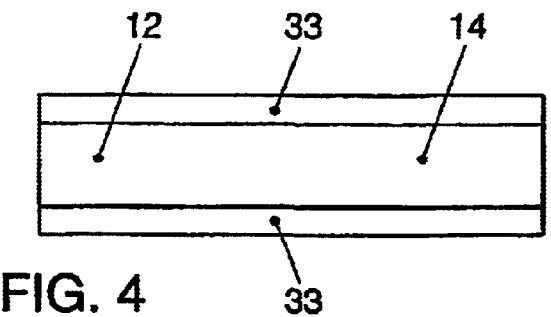
FIGS. 4, 6, 8, 10, and 12 each show schematic side views of various embodiments of an exhaust gas feed line designed as a heat exchanger.
Figure 5:
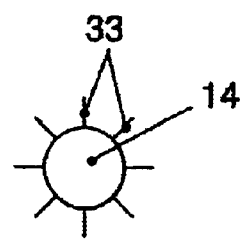
FIGS. 5, 7, 9, 11, and 13 each show schematic front views of the exhaust gas feed line according to FIGS. 4, 6, 8, 10, and 12.
Figure 6:
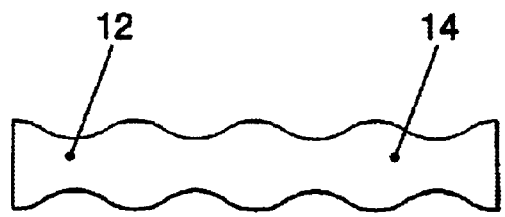
Figure 7:
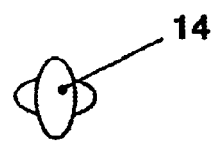
Figure 8:
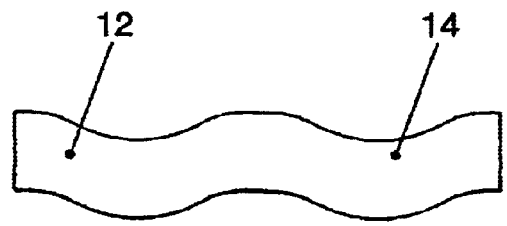
Figure 9:
Figure 10:
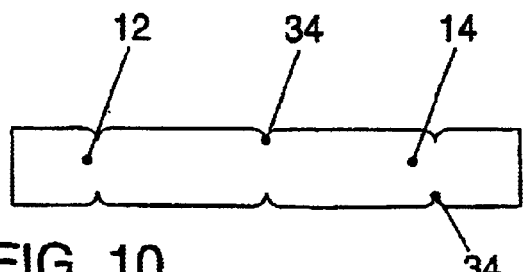
Figure 11:
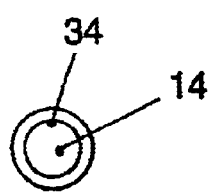
Figure 12:
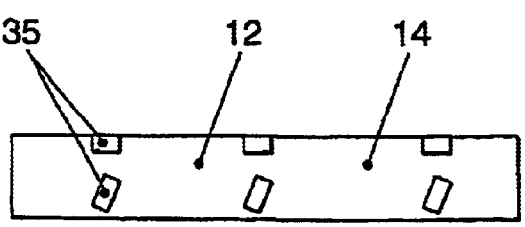
Figure 13:
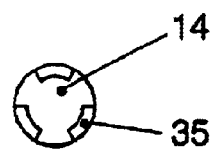

FIGS. 4–13 show various possible designs of additional cooling means. The exhaust gas feed line 12, designed as a heat exchanger 14, according to the FIGS. 4 and 5 is provided with uniformly distributed, outward-projecting ribs 33 mounted on the outside circumference. The ribs 33 serve to increase the area of the heat-transfer surface of the exhaust gas feed line 12 and thus to improve the transfer of heat to the environment. FIGS. 6 and 7 show an exhaust gas feed line 12 designed as a heat exchanger 14, the ovality of which changes in the longitudinal direction. This leads both to an increase in the surface area and also to the creation of turbulence in the exhaust gas stream flowing through the exhaust gas line 12. FIGS. 8 and 9 show an exhaust gas feed line 12 with undulations in the longitudinal direction. Here, too, the surface area is increased and turbulence is created in the exhaust gas stream in flowing through the exhaust gas feed line 12. The exhaust gas feed line 12 according to FIGS. 10 and 11 is provided with inward-projecting indentations 34 around the inside circumference, as a result of which the surface area of the heat-transfer surface is increased and turbulence is also created in the exhaust gas stream flowing through. FIGS. 12 and 13 show an exhaust gas fed line 12, which is provided with pleats 35 on the inside, where the pleats 35 can also be arranged at an angle to the direction of flow. The pleats 35 serve to create turbulence in the exhaust gas stream in the exhaust gas feed line 12 and simultaneously make it possible to increase the area of the heat-transfer surface of the exhaust gas feed line 12.

According to an embodiment which is not shown, the exhaust gas feed lines 12 designed as a heat exchanger 14 can also be designed as pipes with a cross section in the form of an n-sided polygon, a rectangle, a triangle, a half-circle, or a half-oval for the sake of increasing the turbulence. The creation of turbulence in the exhaust gas fed lines 12 designed as a heat exchanger 14 serves in particular to increase the heat transfer from the hot exhaust gas to the outside walls of the corresponding exhaust gas feed line 12. In addition, the creation of turbulence in the exhaust gas in the feed line 12 also prevents a temperature stratification, that is, the formation of an outer cold exhaust gas stream and an inner hot exhaust gas stream, which tends to occur more frequently as the length of the line increases.

According to another embodiment (not shown), the exhaust gas feed lines designed as a heat exchanger 14 can be provided with a coating which promotes the dissipation of heat, and/or the outside surface, which can be structured if desired, can be subjected to a stream of outside air to promote the dissipation of heat.

What is claimed is:

1. An exhaust gas system of an internal combustion engine, comprising: a catalyst; and a cooling section provided upstream of the catalyst, the cooling section including a plurality of exhaust gas lines and additional cooling means provided so that in all operating phases of the internal combustion engine with their different exhaust gas mass flow rates, the amount of thermal energy dissipated from the exhaust gas relative to a total amount of thermal energy present in the exhaust gas (relative heat dissipation) is increased in such a way that a maximum temperature reduction is obtained at intermediate values of the exhaust gas mass flow rate which corresponds to an upper temperature limit for lean engine operation.

2. The exhaust gas system according to claim 1, wherein the additional cooling means comprise at least one exhaust gas feed line configured as a heat exchanger, which has an ovality which varies in a longitudinal direction of the feed line.

3. The exhaust gas system according to claim 1, wherein the additional cooling means comprise at least one exhaust gas line with undulations extending in a longitudinal direction of the exhaust gas line.

4. The exhaust gas system according to claim 1, wherein the additional cooling means comprise at least one exhaust gas feed line with inwardly projecting indentations.

5. The exhaust gas system according to claim 1, wherein the additional cooling means comprise at least one exhaust gas feed line with internal pleats.

6. The exhaust gas system according to claim 5, wherein the pleats are at an angle to a flow direction of gas.

7. The exhaust gas system according to claim 1, wherein the additional cooling means comprise at least one exhaust gas feed line with a cross section formed as one of an n-sided polygon, a rectangle, a triangle, a half-circle, and a half-oval.

8. The exhaust gas system according to claim 1, wherein the additional cooling means has at least one coating in an area of the cooling section to promote heat dissipation.

9. The exhaust gas system according to claim 1, wherein the catalyst is a $NO_x$ storage catalyst.

10. The exhaust gas system according to claim 1, wherein the cooling section and the additional cooling means are configured so that a maximum temperature reduction is obtained in an exhaust gas temperature range of about 400 to about 550° C. upstream of the catalyst and in a velocity range of the motor vehicle in range of about 60 to about 160 km/h.

11. An exhaust gas system of an internal combustion engine, comprising: a catalyst; a cooling section with several separate exhaust gas lines provided upstream of the catalyst; at least one coating in an area of the cooling section to promote heat dissipation of heat; and a device for subjecting the cooling section to a stream of outside air, the cooling section, the coating and the device being correspondingly arranged so that in all operating phases of the internal combustion engine with their different exhaust gas mass flow rates, the amount of thermal energy dissinated from the exhaust gas relative to a total amount of thermal energy present in the exhaust gas (relative heat dissipation) is increased in such a way that a maximum temperature reduction is obtained at intermediate values of the exhaust gas mass flow rate which corresponds to an upper temperature limit for lean engine operation.

12. The exhaust gas system according to claim 11, wherein the cooling section and the additional cooling means are configured so that a maximum temperature reduction is obtained in an exhaust gas temperature range of about 400 to about 550° C. upstream of the catalyst and in a velocity range of the motor vehicle in range of about 60 to about 160 km/h.

* * * * *